UNITED STATES PATENT OFFICE.

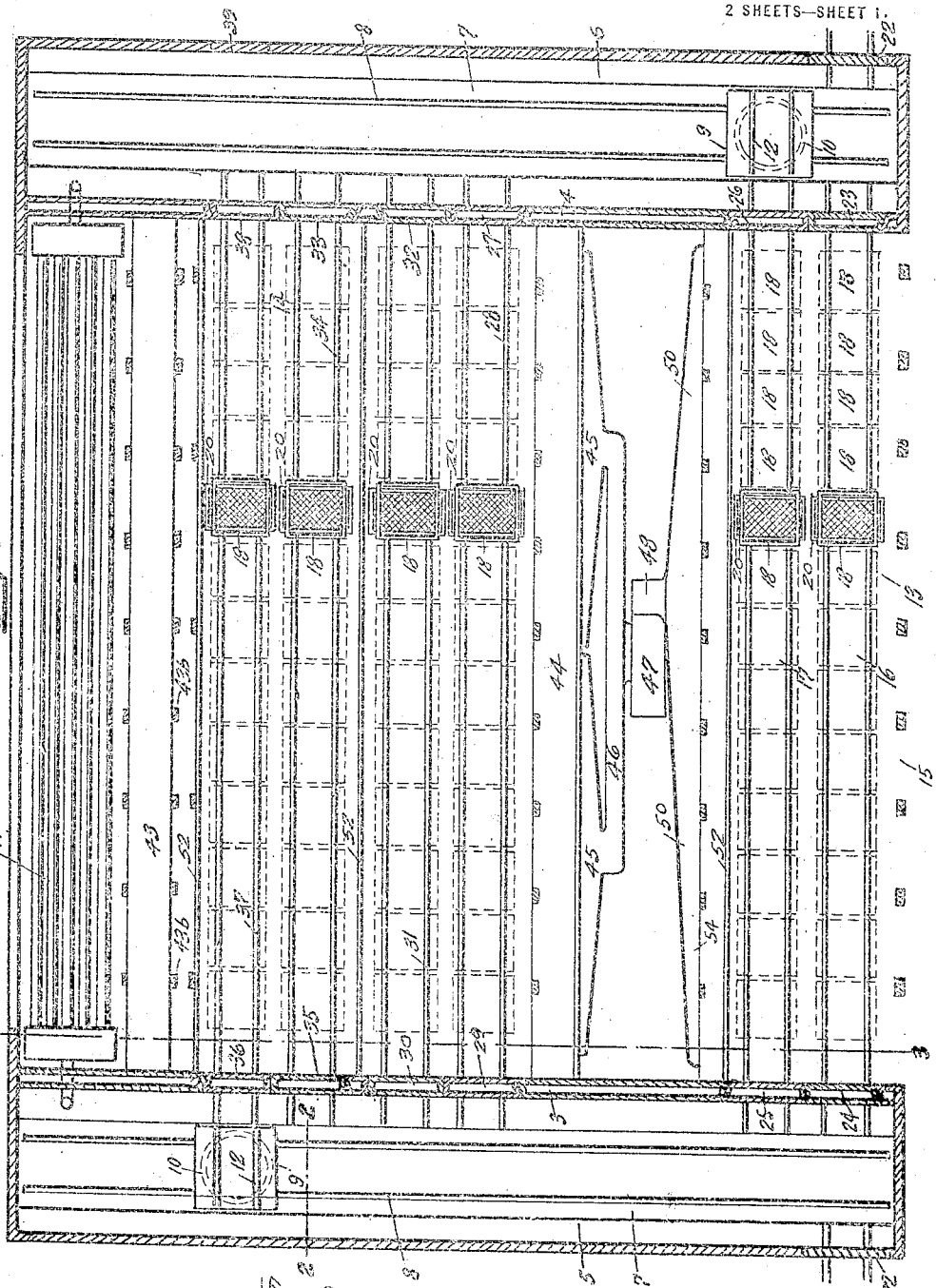
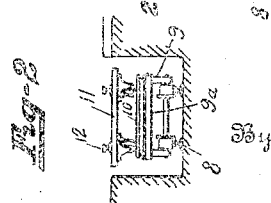

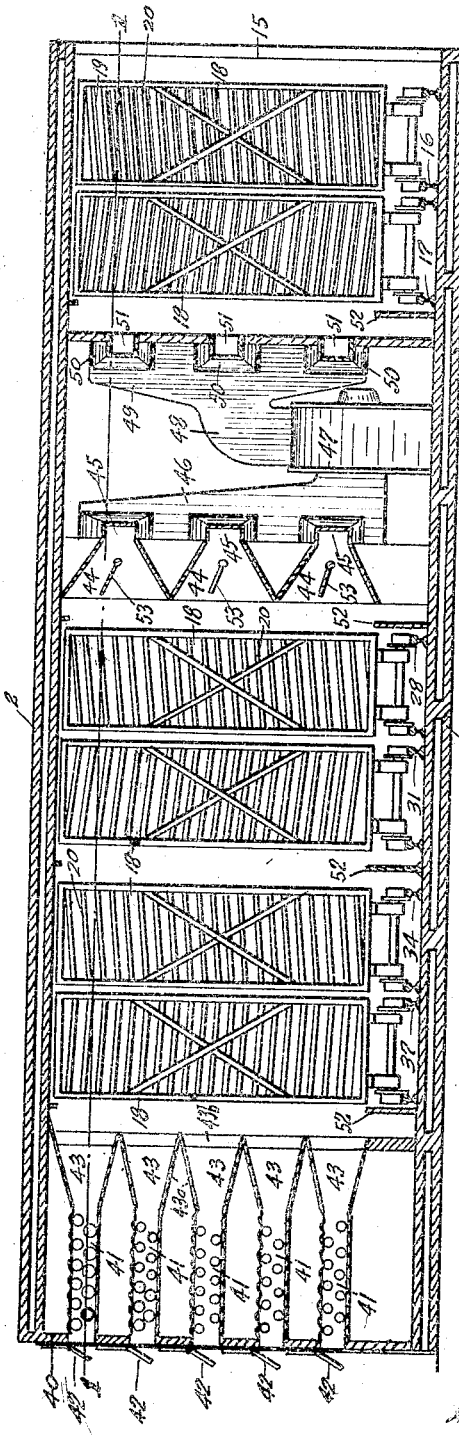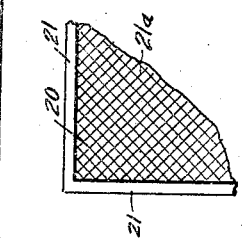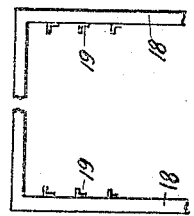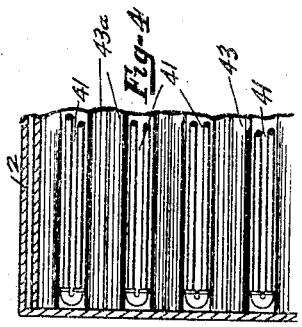

MASON WITTENBERG, OF PORTLAND, AND RALPH WALDO KING, OF THE DALLES, OREGON, ASSIGNORS TO PACIFIC EVAPORATOR COMPANY, OF PORTLAND, OREGON, A CORPORATION OF OREGON.

DRIER.

1,295,946.

Specification of Letters Patent.

Patented Mar. 4, 1919.

Application filed June 30, 1916. Serial No. 106,819.

*To all whom it may concern:*

Be it known that we, MASON WITTENBERG, a citizen of the United States, residing at Portland, county of Multnomah, and State of Oregon, and RALPH W. KING, a citizen of the United States, residing at The Dalles, county of Wasco, and State of Oregon, have invented new and useful Improvements in Driers, of which the following is a specification.

This invention relates to driers and consists in certain improvements in the construction thereof as will be hereinafter fully described and pointed out in the claims.

More particularly the invention is adapted to drying food products, such as vegetables including fruit. In an apparatus of this kind there are two prominent matters of consideration, the quality of the product produced and the cost of producing this product. The object of the present invention is to increase the efficiency of the apparatus without deterioration of product.

The invention is illustrated in the accompanying drawings as follows:—

Figure 1 shows a section on the line 1—1 in Fig. 3.

Fig. 2 a section on the line 2—2 in Fig. 1 showing one of the transfer ways and cars.

Fig. 3 a section on the line 3—3 in Fig. 1.

Fig. 4 an elevation of the side walls of the secondary drying chamber showing the inlet passages.

Fig. 5 a fragment of one of the tray racks.

Fig. 6 a plan view of one of the trays.

1 marks the bottom wall of the drier, and 2 the top wall of the drier. These walls extend throughout the drier. 3 and 4 mark the end walls of the drier and 5 and 6 air locks arranged at the ends of the drier.

The air locks are each provided with a depressed way 7, each having a track 8. Transfer cars 9 are arranged on these tracks, the upper platform on the cars being flush with the floor of the drying chambers. The cars have the frame 9ª on which is arranged a circular track 10 and the turn tables 11 are arranged on the tracks 10. Tracks 12 are mounted on the turn tables and are of a level to be brought into register with tracks leading to the drying chambers.

The primary drying chamber 13 is preferably provided with a plurality of tracks, as shown with the tracks 16 and 17. Cars 18 having tray racks are arranged on these tracks, the cars completely filling the tracks, two of the cars being shown in full and the others being indicated by dash lines. The tray racks are formed by corner posts 18 (see Fig. 5). Angle irons 19 extend between these posts and form slides on which the trays 20 are placed. The trays 20 are provided with the surrounding rail 21 (see Figs. 5 and 6) and the mesh bottoms 21ª. These bottoms support the material but permit the passage of air through it. These cars are introduced to the air lock through any suitable means as the door 22 and by way of the transfer car 9 in the air lock 6 through the door 23 on to the track 16. They are carried through the primary drying chamber through the door 24 and then by the transfer car 9 in the air lock 5 to the track 17 through the door 25, through the primary drying chamber by a door 26 to the air lock 6. They are then transferred by the transfer car 9 in the air lock 6 to a point opposite the door 27 and the car transferred to the track 28 leading to the secondary drying chamber 14. The cars are passed over the track 28 through the door 29 by the transfer car 9 in the air lock 5 to a point opposite the door 30 and then transferred to a track 31 and returned through the secondary drying chamber out of the door 32 to the air lock 6 and again transferred to a point opposite the door 33 and onto the track 34 and again carried through the secondary drying chamber 14 through the door 35 into the air lock 5 and thence by way of the door 36 and track 37, and again returned through the drying chamber 14 out of the door 38 to the air lock 6 from which it may be discharged by any suitable door as 39.

The air is heated prior to its introduction to the drying chamber. A wall 40 is arranged at the inlet side leading to the secondary drying chamber 14. A series of valved openings 42 lead through the wall 40 into the heating passages 41. These heating passages are filled with a heating apparatus, as shown, steam coils, the passages being somewhat reduced to force the air into intimate contact with the coils to give it the proper temperature. The air is drawn through these heating passages and passes into the heating chamber 14 through flaring inlet passages 43, these passages 43 being formed by the plates 43ᵃ—43ᵃ, top and bottom, flaring respectively to each other. The front ends of these plates are supported by posts 43ᵇ. The effect of these flaring inlets is to allow the air to expand as it leaves the confined heating passages and thus give to the entire face of the stacks of trays on the cars in the heating chamber an equal distribution and volume of air.

The air passes from the secondary drying chamber through the passages 44 which are tapered and lead to tubes 45, the passages 44 extending across the entire face of the drying chamber and the slots leading to the tubes 45 extending the full length of the passages 44. The tubes 45 are preferably tapered, being larger at the points where the air is collected in the manifold 46. The air is drawn from the manifold by a fan 47. Thus the air thus induced, passes through the heating passages in the secondary chamber and out of the outlet passages 44 by the suction of the fan.

The air is discharged from the fan by a pipe 48 to a manifold 49. Tubes 50 extend laterally from the manifold 49 and these tubes open into the primary chamber through slots 51, these slots extending preferably lengthwise of the entire face of the primary drying chamber and being arranged at intervals from the floor to the top of said chamber so as to distribute the air through the trays on the cars in the primary chamber. The outer face 15 of the primary drying chamber is open to the air or some larger room so that there is a free discharge of the air on this outer face.

In order to prevent the air passing around the tray racks on the cars, plates 52 extend upwardly from the floor preventing a passage of air through the truck portion of the cars. Several of these plates are provided for this purpose. Adjustable deflecting plates 53 are also provided in the outlet passages 44. The purpose of these is to control the direction of current through the secondary chamber so as to give it approximately a horizontal direction.

It will be noted that the trays are slightly inclined and that this inclination is reversed on the cars on each track. The result of this is that the air passes upwardly through the bottoms of the trays in each alternate track and downwardly through the trays on each alternate track. To accomplish this the cars are turned half around on the transfer cars when the cars are moved from one track to another. This assures an equal drying effect on all portions of the trays. It is preferable to have the air pass through all the bottoms of the trays but only through one tray in each vertical series because should part of the air pass through more than one tray some parts of such trays would be subjected only to the moisture-laden air which has been carried through the tray next to it and while the air passes through a plurality of trays arranged on different tracks there is a uniformity of action on all parts of the tray on the same track. By utilizing the exhaust air from the fan after it is drawn through the secondary drying chamber and using this as a preliminary treatment for the material in the primary drying chamber the efficiency of the apparatus may be very much increased because while the air discharged from the fan is more or less moisture-laden, nevertheless, it will take up a great deal of moisture from the fresh material just going into the drier so that with the same heating capacity and capacity for moving the air the quantity which the drier will turn out is increased. Furthermore it is desirable to subject the material gradually to the drier air so as to prevent surface sealing and thus get a uniform effect throughout the material. In the apparatus as here shown the material is first subjected to the moisture-laden air discharged from the fan in the primary drying chamber and is gradually brought to the final track near the incoming air. This finishes the operation and on this last track 37 all the material is subjected to air of atmospheric humidity.

What we claim as new is:

1. In a drier, the combination of a primary drying chamber; a secondary drying chamber separated from the primary drying chamber; inclosed ways for transferring material from the primary chamber to the secondary chamber; and means for heating air and passing the same through the secondary chamber and conveying and delivering the same to the primary chamber, said ways for transferring material being independent of the means for passing air.

2. In a drier the combination of a primary drying tunnel; a secondary drying tunnel separated from the primary drying tunnel; a plurality of ways in the secondary drying tunnel; means for heating air and passing the same through the secondary tunnel and conveying and delivering the same to the primary tunnel; and inclosed ways on which the material may be conveyed from the primary tunnel to the way in the secondary tunnel remote from the incoming air and then to the way adjacent to the incoming air in said secondary tunnel.

3. In a drier, the combination of a primary drying tunnel; a secondary drying tunnel separated from the primary drying tunnel, said tunnels having a plurality of ways; means for heating air and passing the same through the secondary tunnel and conveying and delivering the same to the primary tunnel, the direction of air in said tunnels being in a horizontal direction; and inclosed ways on which the material may be conveyed from a way remote from the delivery point of the air in the primary tunnel to a way adjacent to the delivery point of said air, thence to a way in the secondary tunnel remote from the incoming air and then to a way in the secondary tunnel adjacent to said incoming air.

4. In a drier, the combination of a primary drying tunnel; a secondary drying tunnel; a common air lock adapted to be connected with both of said tunnels; apparatus for heating air and means for passing air heated by the apparatus independently of the air lock, first through the secondary tunnel and then through the primary tunnel.

5. In a drier, the combination of a primary tunnel and a secondary tunnel arranged side by side; a common air lock extending across the ends of said tunnels; and means for passing air first through the secondary tunnel and then the primary tunnel.

6. In a drier, the combination of a primary drying chamber; a secondary drying chamber; a plurality of ways arranged in said secondary drying chamber; means for drawing air into and through the secondary drying chamber across the ways and discharging the same into the primary chamber and inclosed ways on which the material may be conveyed from the primary chamber to the way in the secondary chamber remote from the incoming air and then to the way adjacent to the incoming air.

7. In a drier, the combination of a drying chamber having horizontal passages leading thereto, said passages terminating in flaring inlets to the drying chamber; a heater for each passage; and means for compelling a movement of air through said heating passages and discharging the same through said flaring inlets to the drying chamber.

8. In a drier, the combination of a drying chamber; a plurality of heaters confined in horizontal passages terminating in flaring inlets leading to the chamber, said inlets making a practically continuous opening at the side of the chamber; and means for drawing air through said passages and across said chamber.

9. In a drier, the combination of a primary drying chamber; a secondary drying chamber; and means for drawing air through the secondary drying chamber and discharging the same to the primary drying chamber, said means comprising a series of tubes having horizontal slots discharging into the primary chamber.

10. In a drier, the combination of a primary drying chamber; a secondary drying chamber; means for supporting a series of trays in each of said chambers, one above another; a series of trays in said means having perforated bottoms; and means for drawing air through the secondary chamber and discharging the same through the primary chamber in a direction to pass the same air through the bottom of one tray only in each series.

In testimony whereof we have hereunto set our hands.

MASON WITTENBERG.
RALPH WALDO KING.